United States Patent
Osame et al.

(10) Patent No.: US 6,663,940 B1
(45) Date of Patent: Dec. 16, 2003

(54) POLYPROPYLENE MULTI-LAYER SEALANT FILMS FOR RETORT PACKAGING

(75) Inventors: Satoshi Osame, Tsuruga (JP); Tadao Yoneyama, Inuyama (JP); Tsutomu Oko, Osaka (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/958,920

(22) PCT Filed: Apr. 14, 2000

(86) PCT No.: PCT/JP00/02433

§ 371 (c)(1),
(2), (4) Date: Dec. 14, 2001

(87) PCT Pub. No.: WO00/63010

PCT Pub. Date: Oct. 26, 2000

(30) Foreign Application Priority Data

Apr. 16, 1999 (JP) ............................................. 11-09012

(51) Int. Cl.⁷ ............................ B32B 3/30; B32B 27/32
(52) U.S. Cl. ....................... 428/141; 428/515; 428/516; 428/349; 428/143; 428/149; 428/220; 428/212
(58) Field of Search ................................ 428/141, 143, 428/149, 349, 220, 212, 515, 516

(56) References Cited

U.S. PATENT DOCUMENTS

| 4,283,453 A | | 8/1981 | Siefried et al. |
|---|---|---|---|
| 4,741,950 A | | 5/1988 | Liu et al. |
| 4,956,232 A | * | 9/1990 | Balloni et al. ............... 428/349 |
| 5,147,696 A | * | 9/1992 | Lansbury et al. .......... 428/36.4 |
| 5,508,090 A | | 4/1996 | Peiffer et al. |
| 5,681,650 A | | 10/1997 | Peiffer et al. |
| 5,891,555 A | * | 4/1999 | O'Brien ...................... 428/213 |
| 2002/0168512 A1 | * | 11/2002 | Eggers et al. ............... 428/335 |

FOREIGN PATENT DOCUMENTS

| EP | 0 011 796 | 6/1980 |
|---|---|---|
| EP | 0 444 339 A1 | 9/1991 |
| EP | 0 618 070 A1 | 10/1994 |
| JP | 406212037 A * | 8/1994 |

* cited by examiner

Primary Examiner—William P. Watkins, III

(57) ABSTRACT

Polypropylene multi-layer sealant films for retort packaging, each including a multi-layer film composed mainly of at least one polypropylene polymer and to be laminated on one surface of a heat-resisting film, the multi-layer film having a first surface facing the heat-resisting film when laminated therewith and further having a second surface on the other side, the first surface having a surface roughness as defined below in (1), and the second surface having a surface roughness as defined below in (2):

(1)
  (i) center-line mean roughness ($R_a$): 0.020 to 0.250 $\mu$m;
  (ii) maximum height ($R_{max}$): 0.3 to 2.9 $\mu$m; and
  (iii) ten-point mean roughness ($R_z$): 0.2 to 2.4 $\mu$m;

(2)
  (i) center-line mean roughness ($R_a$): 0.050 to 0.300 $\mu$m;
  (ii) maximum height ($R_{max}$): 3.0 to 13.0 $\mu$m; and
  (iii) ten-point mean roughness ($R_z$): 2.5 to 11.5 $\mu$m.

4 Claims, 4 Drawing Sheets

POLYPROPYLENE MULTI-LAYER SEALANT FILMS FOR RETORT PACKAGING

TECHNICAL FIELD

The present invention relates to polypropylene multi-layer sealant films for retort packaging, and more particularly, it relates to polypropylene multi-layer sealant films which are used by lamination with heat-resisting films for retort packaging involving heat sterilization.

BACKGROUND ART

Conventional retort-packed products, particularly retort-packed food, usually contain liquid food, such as cooked curry, causing no problem that the inner layers of a packaging material in the retort-packed products may adhere to each other (often referred to as the "blocking") by accident. For this reason, in the laminated films consisting of heat-resisting film layers and sealant layers for retort packaging, the sealant layers may usually be formed from polypropylene films, particularly those of propylene random copolymers or propylene block copolymers. Also known are sealant films of the above polymers containing ethylene-propylene rubber or ethylene-butene rubber mixed therein. However, with the diversification of processed food, retort-packed food has further include various kinds of food without excess water content, such as hamburger and sausage.

Many kinds of meat-processed food, such as hamburger, sausage, and ham, contain no excess liquid flowing around the food. When the former polypropylene films are used for sealant layers, there arises a problem that the sealant layers may cause a phenomenon (often referred to as the "retort blocking") of their adhering (or fusing) to each other at their directly facing portions without these kinds of food intervening therebetween. The retort blocking can be solved by addition of anti-blocking agents to the sealant layers. In the step of lamination with heat-resisting films, however, when the laminated films are rolled up, there arises blocking of the rolled films (often referred to as the "laminate blocking"), even if anti-blocking agents are used as described above, causing a problem, such as variation of tension in unrolling, in the pouch-making process using the rolled films. Further, the retort blocking may be prevented, possibly by the increased roughness on the surface of sealant layers in the laminated films for retort packaging. In this case, however, the other surface of these sealant layers also has increased roughness, and therefore, in the step of lamination with heat-resisting films, air bubbles remain left at the interface between the sealant layers and the heat-resisting films, resulting in poor appearance of the laminated films as packaging materials and thereby making the laminated films unsuitable for practical use.

In the method of spraying silicone-coated starch powder to prevent the laminate blocking of laminated films with heat-resisting films, many problems arise because silicone-coated starch powder is very fine, including deterioration of working conditions in the step of lamination, poor appearance of retort pouches, and floating of powder in the step of food filling.

DISCLOSURE OF INVENTION

Under these circumstances, the present inventors have extensively studied sealant films for retort packaging. As a result, they have found that the control of surface roughness on each surface of a sealant film by taking a multi-layer structure in the sealant film makes it possible to solve the above problems in the prior art, thereby completing the present invention.

Thus, the present invention provides polypropylene multi-layer sealant films for retort packaging, each comprising a multi-layer film composed mainly of at least one polypropylene polymer and to be laminated on one surface of a heat-resisting film, the multi-layer film having a first surface facing the heat-resisting film when laminated therewith and further having a second surface on the other side, the first surface having a surface roughness as defined below in (1), and the second surface having a surface roughness as defined below in (2):

(1)
    (i) center-line mean roughness ($R_a$): 0.020 to 0.250 μm;
    (ii) maximum height ($R_{max}$): 0.3 to 2.9 μm; and
    (iii) ten-point mean roughness ($R_z$): 0.2 to 2.4 μm;

(2)
    (i) center-line mean roughness ($R_a$): 0.050 to 0.300 μm;
    (ii) maximum height ($R_{max}$): 3.0 to 13.0 μm; and
    (iii) ten-point mean roughness ($R_z$): 2.5 to 11.5 μm.

The polypropylene multi-layer sealant films of the present invention can cause no formation of air bubbles at the interface when bonded with heat-resisting films, thereby giving excellent laminate appearance, and can avoid blocking of the sealant films facing each other to cause their fusion after rolling up or after retort packaging.

In a preferred embodiment, the above polypropylene polymer may be a propylene random copolymer or a propylene block copolymer.

In another preferred embodiment, the above multi-layer film may have at least one layer containing at least one thermoplastic elastomer.

BRIEF DESCRIPTION OF DRAWINGS

The present invention will be more particularly described with reference to the accompanying drawings, in which.

MODE FOR CARRYING OUT THE INVENTION

The polypropylene multi-layer sealant film for retort packaging of the present invention comprises a multi-layer film having two or more layers laminated one after another, each layer being a film composed mainly of at least one polypropylene polymer. The multi-layer film has a first surface of a film layer to be laminated on one surface of a heat-resisting film (this film layer being hereinafter referred to as the "lamination-side layer"), the first surface having a surface roughness as defined below in (1), and further has a second surface of a film layer on the other side (this film layer being herein-after referred to as the "seal-side layer"), the second surface having a surface roughness as defined below in (2):

(1)
  (i) center-line mean roughness ($R_a$): 0.020 to 0.250 μm;
  (ii) maximum height ($R_{max}$): 0.3 to 2.9 μm; and
  (iii) ten-point mean roughness ($R_z$): 0.2 to 2.4 μm;
(2)
  (i) center-line mean roughness ($R_a$): 0.050 to 0.300 μm;
  (ii) maximum height ($R_{max}$): 3.0 to 13.0 μm; and
  (iii) ten-point mean roughness ($R_z$): 2.5 to 11.5 μm.

Figure 1A:
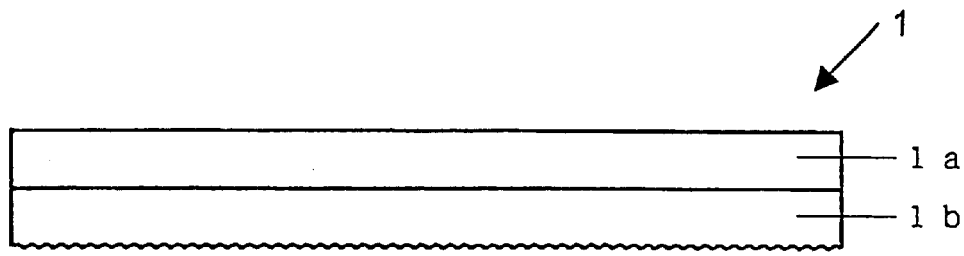
FIG. 1A is a schematic view in section of a polypropylene multi-layer sealant film for retort packaging of the present invention.
Figure 1B:
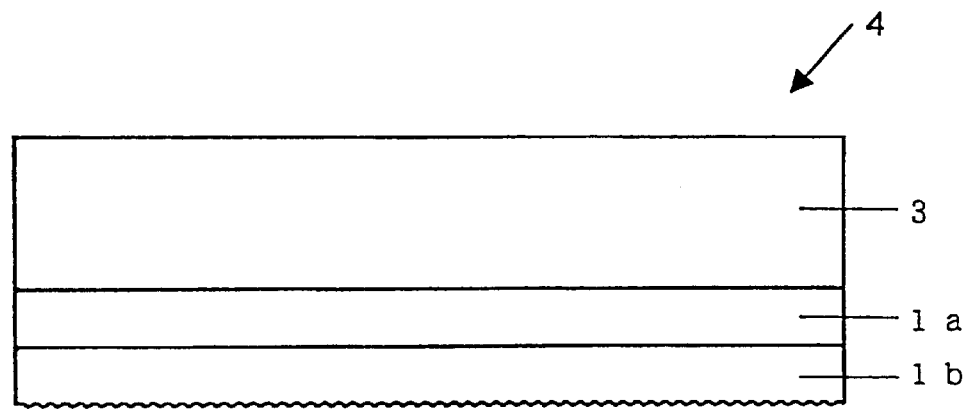
FIG. 1B is a schematic view in section of a laminated film for retort packaging, which is obtained by lamination of a polypropylene multi-layer sealant film for retort packaging of the present invention with a heat-resisting film.

FIG. 1A shows a typical example of the polypropylene multi-layer sealant film for retort packaging of the present invention. In this figure, multi-layer sealant film 1 consists of two layers, ie., lamination-side layer 1a and seal-side layer 1b formed thereon. As shown in FIG. 1B, heat-resisting film 3 is laminated on the lamination-side layer 1a of multi-layer sealant film 1 to produce laminated film 4 for retort packaging.

Figure 2:
FIG. 2 is a schematic view in section of a conventional sealant film.

The multi-layer sealant film of the present invention is characterized in that it has different values of surface roughness on the surface of lamination-side layer 1a (i.e., first surface) and on the surface of seal-side layer 1b (i.e., second surface) as described above. In contrast, a conventional sealant film consisting of single layer 2 as shown in FIG. 2 has the same value of surface roughness on both surfaces. This difference results in the above advantageous effects attained by the multi-layer sealant film of the present invention.

Figure 3:
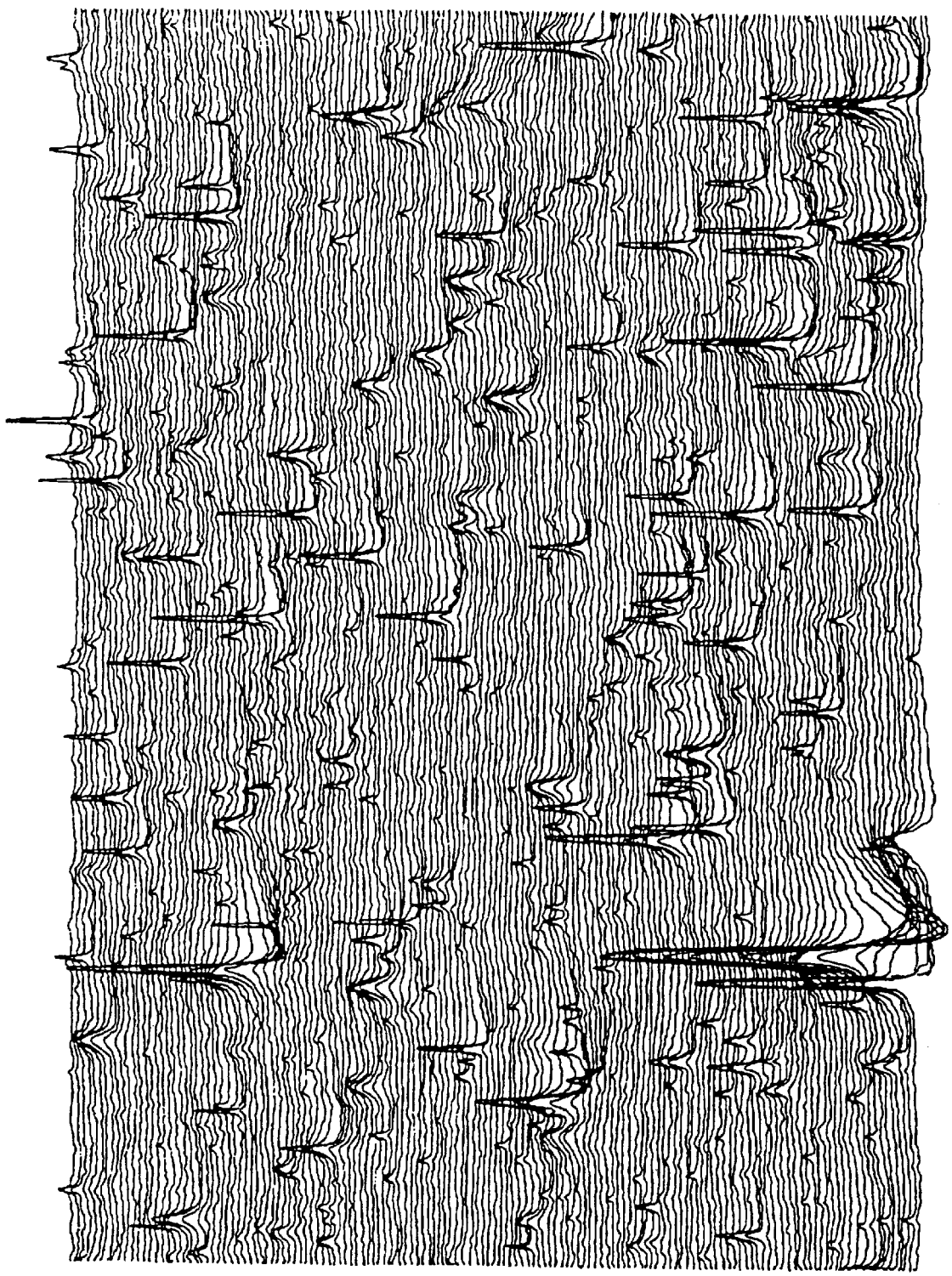
FIG. 3 is a chart of the measurement of surface roughness for the seal-side layer (defined below) in the polypropylene multi-layer sealant film for retort packaging of the present invention.
Figure 4:
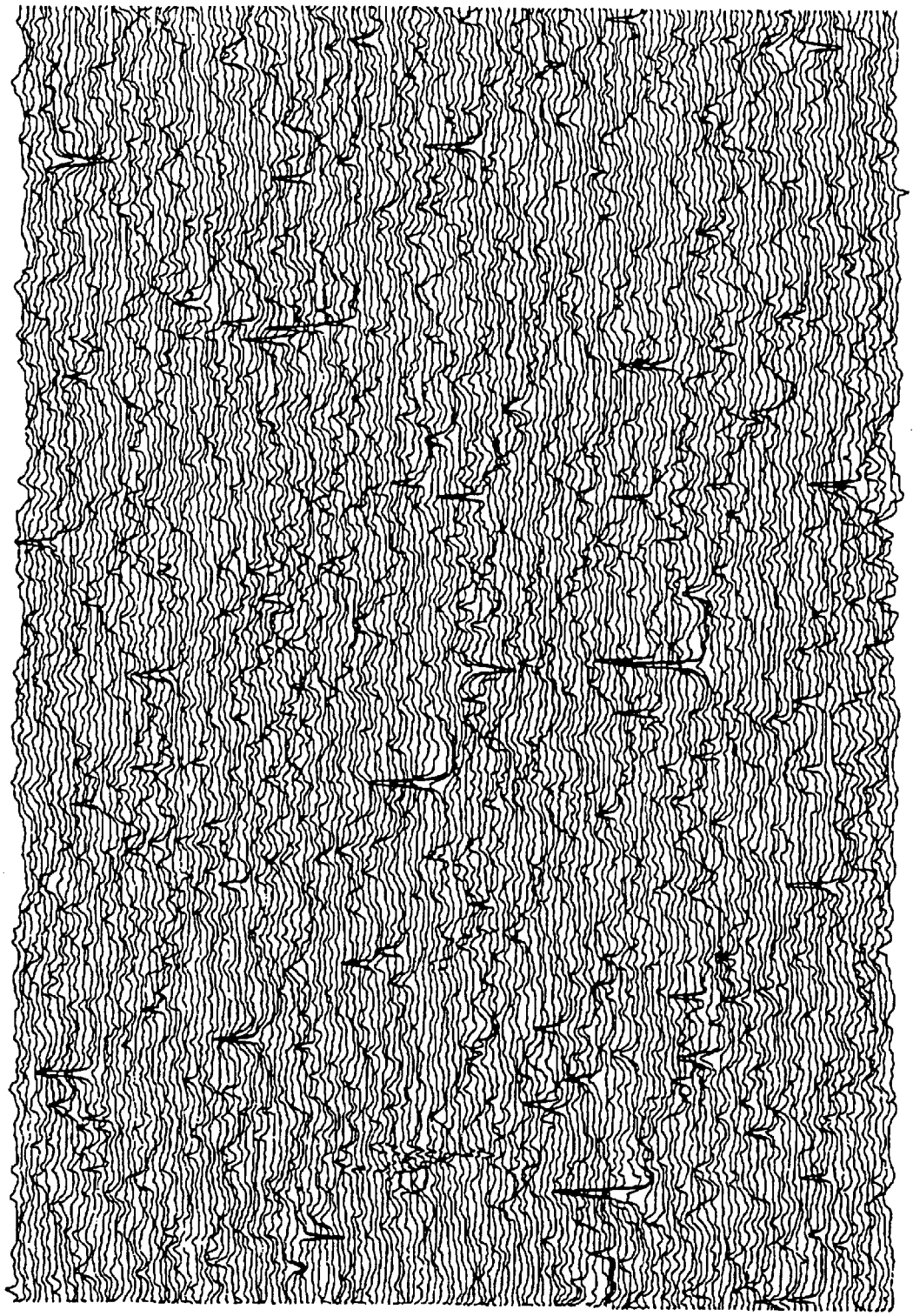
FIG. 4 is a chart of the measurement of surface roughness for the lamination-side layer (defined below) in the polypropylene multi-layer sealant film for retort packaging of the present invention.

For better understanding, charts in FIGS. 3 and 4 show the three-dimensional surface roughness of the seal-side layer and the lamination-side layer, respectively, in the multi-layer sealant film of the present invention. These charts were obtained in the measurement of surface roughness by the stylus method, the measuring area being 1 mm in length (vertical direction) and 0.2 mm in width (horizontal direction), and one hundred measuring lines running in the vertical direction with an interval of 2 μm. In the measurement, the interval of measuring lines should be selected to obtain the correct information of surface roughness because an unduly broadened interval may cause missing of some high peaks possibly present in places. For example, the interval of measuring lines can preferably be, but is not limited to, the above value (i.e., 2 μm).

As can be seen from these charts, the lamination-side layer is more smooth all over the surface than the seal-side layer, so that the multi-layer sealant film of the present inventions can cause no formation of air bubbles at the interface when bonded with heat-resisting films, thereby giving excellent laminate appearance; and the seal-side layer has some high peaks in places, so that the multi-layer sealant films of the present invention can avoid blocking of the sealant films facing each other to cause their fusion after rolling up or after retort packaging.

In the multi-layer sealant film of the present invention, each layer is composed mainly of at least one polypropylene polymer, of which composition may be the same or different for plural layers. The polypropylene polymers which can be used herein may include, but are not limited to, polypropylene homopolymer, random copolymers containing larger amounts of propylene and smaller amounts of α-olefins, preferably ethylene or butene, and block copolymers having both segments containing larger amounts of propylene and smaller amounts of α-olefins such as ethylene or butene and segments containing smaller amounts of propylene and larger amounts of α-olefins such as ethylene or butene. The multi-layer sealant film may usually have two or three layers formed from these polypropylene polymers.

The polypropylene polymers to be used in the present invention may be random copolymers of propylene and α-olefin monomers, having melting points in the range of about 130° C. to 150° C. The α-olefin monomers which can be used herein may include, but are not limited to, ethylene, butene-1, pentene-1, 4-methylpentene-1, hexene-1, and octene-1. Particularly preferred are ethylene and butene-1. The polypropylene random copolymers having melting points in the above range can be obtained by copolymerization of propylene with one or more α-olefin monomers according to various methods. The amounts of α-olefins in the propylene random copolymers, although they are not particularly limited, may preferably be 5% or lower by weight. The propylene random copolymers may preferably have a melt flow index (MFI) at 230° C. of 1 to 10 g/10 min., more preferably 2 to 5 g/10 min. The propylene random copolymers having melting points higher than 150° C. are not preferred because the resulting multi-layer sealant films are liable to have poor transparency or the heat-sealing temperature will become higher. The propylene random copolymers having melting points lower than 130° C. are also not preferred because the resulting multi-layer sealant films will become brittle by their recrystallization at temperatures for retort packaging, thereby lowering impact resistance at low temperatures.

The polypropylene polymers to be used in the present invention may also be block copolymers having both segments containing larger amounts of propylene and smaller amounts of α-olefins such as ethylene or butene and segments containing smaller amounts of propylene and larger amounts of α-olefins such as ethylene or butene. The amounts of α-olefins in the propylene block copolymers, although they are not particularly limited, may preferably be 2% to 17% by weight, more preferably 2% to 10% by weight. The propylene block copolymers may preferably have a melt flow index (MFI) at 230° C. of 1 to 10 g/10 min., more preferably 2 to 5 g/10 min. The propylene block copolymers having melting points higher than 150° C. are not preferred because the resulting multi-layer sealant films are liable to have poor transparency or the heat-sealing temperature will become higher. The propylene block copolymers having melting points lower than 130° C. are also not preferred because the resulting multi-layer sealant films will become brittle by their recrystallization at temperatures for retort packaging, thereby lowering impact resistance at low temperatures.

The thermoplastic elastomer to be contained in at least one layer in the multi-layer sealant film composed mainly of at least one polypropylene polymer may include, but are not limited to, ethylene-propylene rubber (EPR), ethylene-butene rubber (EBR), ethylene-vinyl acetate copolymer (EVA), and hydrogenated block copolymers. These thermoplastic elastomers may be used alone or in combination. The thermoplastic elastomer can be added at an amount of 3% to 20% by weight, preferably 5% to 15% by weight, based on the total weight of the components contained in this layer. The addition of a thermoplastic elastomer within the above range makes it possible to attain satisfactorily improved impact resistance at low temperatures, whereas the addition of a thermoplastic elastomer beyond the above range makes it easy to increase the amount of thermoplastic elastomer extracted with solvents or others, thereby possibly causing a problem of food hygiene.

The hydrogenated block copolymers have a structure consisting of polymer block A composed mainly of at least one vinyl aromatic compound and polymer block B composed mainly of the hydrogenated product of at least one conjugated diene compound, for example, hydrogenated block copolymers consisting of A-B-A, B-A-B-A or B-A-B-A-B, and mixtures thereof. The hydrogenated block copolymers which can be used herein may include those containing vinyl aromatic compounds at amounts of 10% to 40% by weight.

The vinyl aromatic compound contained in the hydrogenated block copolymer may include, but is not limited to, styrene, which is particularly preferred, and α-methylstyrene. The conjugated diene compound before hydrogenation may include, but are not limited to, butadiene, which is particularly preferred, isoprene, and 1,3-pentadiene. The hydrogenated block copolymer may preferably contain olefin compound polymer block B obtained by hydrogenation of 80% or more, preferably 90% or more, of aliphatic double bonds based on the conjugated diene compound in the vinyl aromatic compound-conjugated diene compound block copolymer. A typical example of the hydrogenated block copolymer is styrene-ethylene-butylene-styrene copolymer (SEBS), the amount of styrene copolymerized preferably ranging from 10% to 30% by weight.

From the viewpoint of transparency, the thermoplastic elastomer may preferably be SEBS with the amount of styrene copolymerized ranging from 10% to 20% by weight, more preferably EPR or EBR. From the view-point of impact resistance, the thermoplastic elastomer may preferably be SEBS or EPR. The thermoplastic elastomer may preferably have a melt flow index (MFI) at 230° C. of 5 g/10 min. or smaller, more preferably 0.2 to 5 g/10 min., from the viewpoint of impact resistance at low temperatures.

The multi-layer film composed mainly of at least one polypropylene copolymer may have the above surface roughness on each surface controlled by addition of inorganic particles such as spherical silica, amorphous silica, zeolite, talc, mica, alumina, hydrotalcite, and aluminum borate, or organic particles such as polymethyl methacrylate and polystyrene, which have been widely used as anti-blocking agents in the conventional films. The control of surface roughness can be achieved by the selection of particles suitable for the respective layers. More particularly, the lamination side layer can have a smooth surface by the use of relatively small particles of isotropic (e.g., spherical or amorphous) shape, for example, spherical or amorphous silica 2 to 5 μm in particle size at an amount of 0.2% to 1.0% by weight, while the seal-side layer can have some high peaks in places on the surface by the use of relatively large particles (e.g., cylindrical or prismatic) in addition to relatively small particles of isotropic (e.g., spherical or amorphous) shape, for example, a combination of aluminum borate 3 to 7 μm in particle size and spherical or amorphous silica 2 to 5 μm in particle size at amounts of 0.3% to 1.0% by weight, respectively. In any event, it is important to meet the conditions of surface roughness as defined above both for the lamination-side layer and for the seal-side layer.

Preferred examples of the multi-layer film are polypropylene multi-layer sealant films having two layers, i.e., (a) lamination-side layer and (b) seal-side layer, and polypropylene multi-layer sealant films having three layer, i.e., the above two layers and (c) intermediate layer formed therebetween. The polypropylene multi-layer sealant film may usually have a thickness of 10 to 200 μm, preferably 25 to 100 μm, although the thickness can be freely determined taking into consideration specific applications as a sealant film for retort packaging. The ratio of thickness may preferably be 10% to 50% for the lamination-side layer and 90% to 50% for the seal-side layer in two-layer films, and 10% to 49% for the lamination-side layer, 2% to 79% for the intermediate layer, and 90% to 49% for the seal-side layer in three-layer films.

The polypropylene multi-layer sealant film for retort packaging of the present invention may preferably be produced, for example, by adding the above particles at amounts needed to polymers composed mainly of at least one polypropylene polymer for the respective layers, followed by melting, and then separately passing through each extruder screw, laminating, and extruding from a T-die onto a cooling roll by the co-extrusion technique.

The producing process for the polypropylene multi-layer sealant film of the present invention will be further illustrated by the following typical example. The film can be obtained by mixing polymers to be used in the present invention at a prescribed ratio, followed by melt extrusion, for example, at 200° C. to 280° C., and filtration through a filter, and then extruding from a die into a sheet shape, and rolling up on a metal drum at 20° C. to 80° C. for cooling and solidifying, or alternatively, extruding from a die into a tube shape, followed by air blowing to form a bubble of the film and then cooling in air. If necessary, the film may be subjected to uniaxial or biaxial orientation.

In the polypropylene multi-layer sealant film of the present invention, the seal-side layer should have slip properties and blocking resistance in addition to heat-sealing properties, whereas the lamination-side layer should have suitability for lamination with a heat-resisting film, i.e., no formation of air bubbles at the interface after lamination. The intermediate layer, if present, should preferably have heat-sealing properties and impact resistance at low temperatures in addition to properties of bonding the lamination-side layer and the seal-side layer. Thus, the polypropylene multi-layer sealant film of the present invention can be laminated with a heat-resisting film making a clear bonded interface therebetween, thereby giving excellent laminate appearance, and can avoid blocking of seal-side layers in the multi-layer sealant films facing each other both after rolling up and after retort packaging.

The polypropylene multi-layer sealant film of the present invention may further contain, if necessary, heat stabilizers, antioxidants, inorganic or organic lubricants, antistatic agents, and any other additives, so long as the above advantageous effects cannot be deteriorated.

The polypropylene multi-layer sealant film of the present invention may be laminated on the surface of its lamination-side layer through an adhesive with a heat-resisting film such as nylon-6 biaxially-oriented film, nylon-6,6 biaxially-oriented film, polyethylene terephthalate biaxially-oriented film, polybutylene terephthalate biaxially-oriented film, polyimide film, polyamide-imide film, or polyarylate film. Alternatively, the polypropylene multi-layer sealant film of the present invention may be laminated by melt extrusion on the surface of a heat-resisting film. The polypropylene multi-layer sealant film of the present invention may preferably be subjected to physical or chemical surface treatment for increasing adhesion on the surface of its lamination-side layer. The surface treatment may include, but is not limited to, electrical surface treatments such as corona discharge and plasma treatment, and chemical treatments such as acid treatment and alkali treatment. These treatments may be carried out alone or in combination.

Figure 5A:
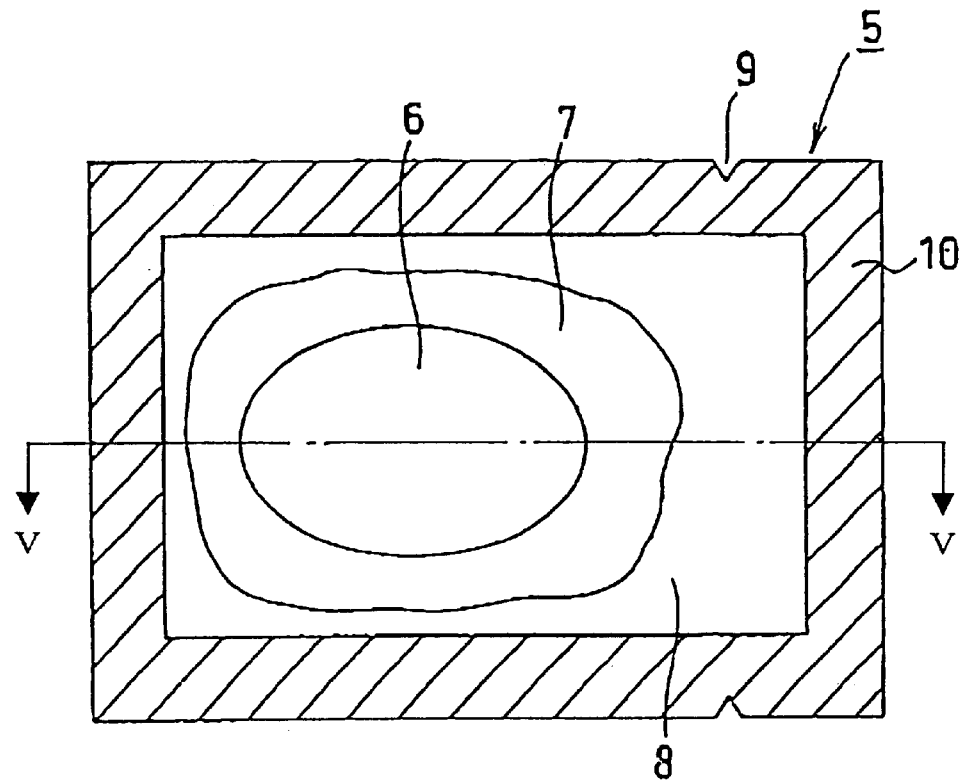
FIG. 5A is a schematic view in plan of a retort-packed product.
Figure 5B:
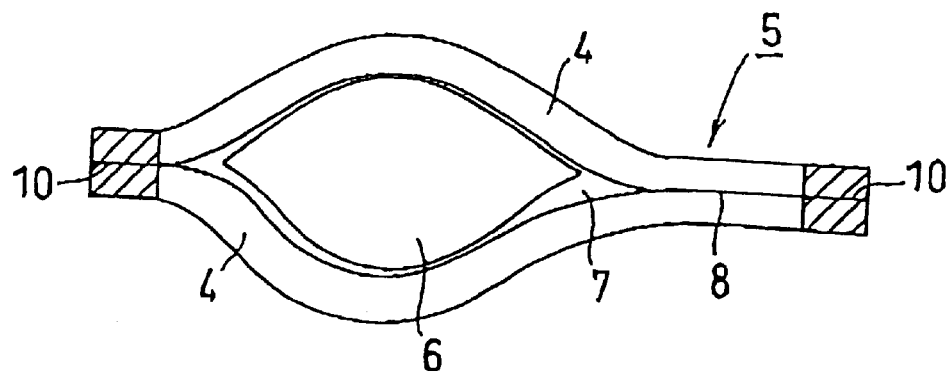
FIG. 5B is a schematic view in section of the retort packed-product, taken in the direction of arrows substantially along line V—V in FIG. 5A.

The laminated film thus obtained is used for retort packaging by the ordinary method. FIG. 5A shows an example of the retort-packed product containing solid contents 6 surrounded by liquid contents 7 in a retort pouch which has been made of laminated film 4 and heat-sealed on four side edges (i.e., heat-sealed edges 10). FIG. 5B shows a section of the retort-packed product 5, taken in the direction of arrows substantially along line V—V in FIG. 5A. In FIG. 5B, reference numeral 8 indicates a portion exhibiting possible fusion of two laminated films 4, 4 directly facing each other (if the sealant films used therein are conventional). The retort pouch is produced, for example, by placing two laminated films having a prescribed width one on top of the other so that the seal-side layers in the laminated films face each other, and heat-sealing both side edges of the laminate in the length-wise direction, followed by rolling up. The rolled film thus obtained is cut into a prescribed length for the retort pouch in the retort packaging. The retort-packed product is produced, for example, by unrolling and cutting the rolled films into a retort pouch and heat-sealing the other side edges, while performing food filling and air discharge, followed by formation of notches 9, 9 for opening and subsequent heat sterilization. As a matter of course, the production of retort pouches and retort-packed products is not limited to these examples, but may be carried out by any of the conventional processes.

The polypropylene multi-layer sealant film of the present invention can solve several problems at once by its use as a sealant film to be laminated with a heat-resisting film to produce a packaging material, i.e., retort pouch, for retort-packed products; for example, no formation of air bubbles when the sealant film is laminated with the heat-resisting film, no laminate blocking between the seal-side layer in the film of the present invention and the heat-resisting film when the laminated film is made into a rolled film, and no retort blocking of the seal-side layers in the laminated films facing each other in retort processing.

EXAMPLES

The present invention will be further illustrated by the following examples; however, the present invention is not limited to these examples.

The characteristics of films as used herein can be determined by the following measuring methods.

(1) Surface Roughness

In accordance with JIS B 0601-1962 (Surface Roughness-Definitions and Designations), parts of a surface to be measured, each 1 mm in length and 0.2 mm in width, which have been randomly sampled from the surface of a sample film 3 cm square, are measured by the methods as described below using a stylus-contact type surface roughness measuring apparatus (model ET30HK, available from Kosaka, Ltd.), and the arithmetic mean values of the respective measured values are regarded as (i) center-line mean roughness ($R_a$), (ii) maximum height ($R_{max}$), and (iii) ten-point mean roughness ($R_z$).

A contour appearing on a cut end, when a surface to be measured has been cut with a plane which is perpendicular to that surface, is hereinafter referred to as the "profile". A curve which has been cut off any longer surface waviness component than a prescribed wave length from the profile is hereinafter referred to as the "roughness curve".

A straight line or a curve having a geometrical feature of a surface to be measured within a sampled part of the profile or roughness curve, as well as so established that the sum of the squares of the deviations of the profile or roughness curve from that line is minimum, is hereinafter referred to as the "mean line of profile or roughness curve". A straight line which has been drawn in parallel with the mean line of the roughness curve so that the sums of the areas contained between it and the roughness curve which lie on each side of it are equal is hereinafter referred to as the "center-line". The direction vertical to relative moving direction of the stylus to the surface to be measured is hereinafter referred to as the "direction of vertical magnification".

When a profile has been cut with the mean line, the protruding part of a real surface above the mean line, within the profile connecting two adjacent points of the intersection thereof, is hereinafter referred to as the "profile peak". When a profile has been cut with the mean line, the sunken part of a real surface below the mean line, within the profile connecting two adjacent points of the intersection thereof, is hereinafter referred to as the "profile valley".

A point of the highest altitude in a profile peak is hereinafter referred to as the "peak". A point of the lowest altitude in a profile valley is hereinafter referred to as the "valley".

(i) Center-line Mean Roughness ($R_a$)

The center-line mean roughness, when the roughness curve has been expressed by y=f(x), shall be a value, being expressed in micrometer ($\mu$m), that is obtained from the following formula I, extracting a part of measuring length L (e.g., 25 mm as a standard value, but not limited thereto) in the direction of its center-line from the roughness curve, and taking the center-line of this extracted part as X-axis and the direction of vertical magnification as Y-axis.

$$R_a = \frac{1}{L}\int_0^L |f(x)|dx \qquad (I)$$

(ii) Maximum Height ($R_{max}$)

The maximum height, when a sampled portion has been interposed between the two parallel straight lines with a mean line of which length corresponds to the reference length (e.g., 25 mm as a standard value, but not limited thereto) that has been sampled from the profile, hereinafter referred to as the "sampled portion", shall be the value, expressed in micrometer ($\mu$m) measuring the spacing of these two straight lines in the direction of vertical magnification of the profile.

(iii) Ten-point Mean Roughness ($R_z$)

The ten-point mean roughness shall be the value of difference, being expressed in micrometer ($\mu$m), between the mean value of altitudes of peaks from the highest to the 5th, measured in the direction of vertical magnification from a straight line that is parallel to the mean line and that does not intersect the profile, and the mean value of altitudes of valleys from the deepest to the 5th, within a sampled portion, of which length corresponds to the reference length (e.g., 25 mm as a standard value, but not limited thereto), from the profile.

(2) Laminate Appearance

A sample film (the lamination-side layer of a sample film, when the sample film is a multi-layer film) is dry laminated onto a nylon-6 biaxially-oriented film using a polyester adhesive, followed by aging at 40° C. for 2 days, and the laminated film is evaluated by visual observation for the number of air bubbles formed in an area of 1000 cm² The criteria of evaluation are as follows:

○: 0 to 5 air bubbles/1000 cm²

Δ: 6 to 20 air bubbles/1000 cm²

X: 21 air bubbles or more/1000 cm²

(3) Laminate Blocking Strength

A sample film 7 cm square (the lamination-side layer of a sample film, when the sample film is a multi-layer film) is dry laminated onto a nylon-6 biaxially-oriented film of the same size using a polyester adhesive, followed by aging at 40° C. for 2 days. Two laminated films thus obtained are placed one on top of the other so that the seal-side layer of the sample film in one film faces to the nylon-6 biaxially-oriented film in the other film, followed by preheating treatment at 50° C. for 30 minutes. A center portion, 5 cm square, of the laminated film is then pressed under a load of 40 kgf using a hot press at 50° C. for 15 minutes, followed by 180° peeling test with a tensile tester to determine peeling strength (i.e., a load needed for peeling) as the laminate blocking strength. The criteria of laminate blocking strength are as follows:

○: 0 to 15 g/70 mm (usable without silicone-coated starch powder)

Δ: 15 to 30 g/70 mm (some silicone-coated starch powder needed)

X: 30 g or more/70 mm (4) Fusion Blocking Strength in Retort Processing

A sample film (the lamination-side layer of a sample film, when the sample film is a multi-layer film) is dry laminated onto a nylon-6 biaxially-oriented film using a polyester adhesive, followed by aging at 40° C. for 2 days. Two laminated films thus obtained are placed one on top of the other laminated film so that the seal-side layers in both films face each other, and this laminate is sampled in a size of 11 cm×14 cm, followed by hot water treatment in an autoclave at 125° C. under a load of 1 kgf for 30 minutes. This laminate is sampled again in a size of 3 cm×14 cm, peeled in the length of 6 cm by hand, and subjected to 180° peeling test with a tensile tester to determine peeling strength (i.e., a maximum load needed for peeling in the length of 8 cm) as the fusion blocking strength in retort processing. The criteria of fusion blocking strength in retort processing are as follows:

○: 0 to 5 g/80 mm (almost no fusion found)

Δ: 5 to 20 g/80 mm (some fusion found)

X: 20 g/80 mm or more (5) Haze (transparency)

In according with JIS K 7105 (Testing Methods for Optical Properties of Plastics), a sample film 5 cm square (a sealant film or its laminate with nylon-6 biaxially-oriented film) is measured for diffuse transmittance and total light transmittance by an integrating sphere type light transmittance measuring apparatus, and the haze is calculated as the ratio of diffuse transmittance to total light transmittance by the following formula II:

$$H = \frac{T_d}{T_t} \times 100 \quad \text{(II)}$$

where H is haze (%), $T_d$ is diffuse transmittance (%), and $T_t$ is total light transmittance (%).

(6) Melting Point ($T_m$)

A peak temperature of the maximum endothermic peak at the time of crystalline melting in a chart of differential scanning calorimetry as obtained at the speed of temperature rise equal to 10° C./min. by a differential scanning calorimeter is regarded as the melting point (° C.).

(7) Melt Flow Index (MFI)

In accordance with JIS K 6758 (Testing Methods for Polypropylenes), an extrusion type plastometer with a cylinder, a piston, and a die attached is kept at 230° C. for at least 15 minutes, and a sample is charged in the cylinder and extruded through the die by the piston weighed with a load of 2.16 kgf. The extrudate 6 minutes after preheating is discarded and the subsequent extrudate is cut off when the time has reached to a certain time for sampling (e.g., 60 seconds for MFI of 1.0 to 3.5 g/10 min., 30 seconds for MFI of 3.5 to 10 g/10 min.). Using the extrudate as the sample to be weighed, provided that it is free from air bubbles, the sample is weighed accurately to 1 mg after cooling. MFI shall be calculated as the mass (g) of the sample polymer extruded in 10 minutes from the following formula III:

$$MFI = \frac{600 \times m}{t} \quad \text{(III)}$$

where m is mean mass value of cut-off sample (g), t is time for taking sample to be weighed (sec.), and 600 is number of seconds for 10 minutes.

Examples 1–3 and Comparative Examples 1–6

The polypropylene polymers and particles recited below were mixed at the ratios shown in Table 1, and the mixtures were fed to two extruders for separate melt extrusion of a seal-side layer and a lamination-side layer in Examples 1–3 and Comparative Examples 1–3, or to one extruder for melt extrusion of a single layer in Comparative Examples 4–6. The melt extrusion was carried out by leading the molten mixture to a die with a slit-shaped discharge opening, discharging it from the die into a sheet, followed by rolling up on a metal drum for cooling, which afforded a rolled film. The films thus obtained were evaluated for various characteristics. The results are shown in Table 2.

(a) propylene-ethylene random copolymer having an ethylene content of 5% by weight and a melt flow index (MFI) at 230° C. of 3.6 g/10 min.

(b) propylene-ethylene block copolymer having an ethylene content of 10% by weight and a melt flow index at 230° C. of 4.0 g/10 min.

(c) ethylene-propylene rubber having an ethylene content of 60% by weight and a melt flow index (MFI) at 230° C. of 4.0 g/10 min.

(d) amorphous silica of the agglomerate type having a particle size of 2 μm (e) amorphous silica of the agglomerate type having a particle size of 6 μm (f) spherical silica of the agglomerate type having a particle size of 2 μm (g) spherical silica of the single particle size type having a particle size of 4 μm (h) aluminum borate of the single shape type having a particle size of 6 μm

TABLE 1

| Film composition* | | Examples | | | Comparative Examples | | | | | |
|---|---|---|---|---|---|---|---|---|---|---|
| | | 1 | 2 | 3 | 1 | 2 | 3 | 4 | 5 | 6 |
| Propylene-ethylene random copolymer (a) (wt %) | SS layer | 79.0 | 78.8 | | 79.5 | 79.5 | 78.8 | 78.8 | 78.8 | |
| | LS layer | 79.8 | 79.6 | | 79.8 | 79.8 | 79.6 | | | |
| Propylene-ethylene block copolymer (b) (wt %) | SS layer | | | 79.0 | | | | | | 78.8 |
| | LS layer | | | 79.8 | | | | | | |
| Ethylene-propylene rubber (c) (wt %) | SS layer | 20.0 | 20.0 | 20.0 | 20.0 | 20.0 | 20.0 | 20.0 | 20.0 | 20.0 |
| | LS layer | 20.0 | 20.0 | 20.0 | 20.0 | 20.0 | 20.0 | | | |
| Film structure (single layer or laminated layers) | | two diff. layers | two diff. layers | two diff. layers | two diff. layers | two diff. layers | two diff. layers | single layer | single layer | single layer |
| 2 μm Amorphous silica (d) (wt %) | SS layer | | 0.2 | | | | 0.2 | 0.2 | 0.2 | 0.2 |
| | LS layer | 0.2 | | 0.2 | 0.2 | 0.2 | | | | |
| 6 μm Amorphous silica (e) (wt %) | SS layer | | | | | | 0.4 | | | |
| | LS layer | | | | | | | | | |
| 2 μm Spherical silica (f) (wt %) | SS layer | | | | | | | | 1.0 | |
| | LS layer | | 0.4 | | | | 0.4 | | | |
| 4 μm Spherical silica (g) (wt %) | SS layer | 0.5 | 0.6 | 0.5 | 0.5 | | 0.6 | | 0.5 | 0.5 |
| | LS layer | | | | | | | | | |
| 6 μm Aluminum borate (h) (wt %) | SS layer | 0.5 | 0.4 | 0.5 | | 0.5 | | | 0.5 | 0.5 |
| | LS layer | | | | | | | | | |

*SS layer and LS layer mean the "seal-side layer" and "lamination-side layer", respectively.

TABLE 2

| | | Examples | | | Comparative Examples | | | | | |
|---|---|---|---|---|---|---|---|---|---|---|
| | | 1 | 2 | 3 | 1 | 2 | 3 | 4 | 5 | 6 |
| Surface Roughness | | | | | | | | | | |
| LS layer* | Center-line mean roughness (μm) | 0.031 | 0.033 | 0.031 | 0.033 | 0.032 | 0.042 | 0.041 | 0.092 | 0.165 |
| | Maximum height (μm) | 1.5 | 2.0 | 1.5 | 1.6 | 1.6 | 1.8 | 2.4 | 7.3 | 8.1 |
| | Ten-point mean roughness (μm) | 1.2 | 1.6 | 1.2 | 1.2 | 1.2 | 1.5 | 1.8 | 5.9 | 7.0 |
| SS layer* | Center-line mean roughness (μm) | 0.092 | 0.105 | 0.156 | 0.063 | 0.038 | 0.103 | 0.041 | 0.094 | 0.162 |
| | Maximum height (μm) | 7.3 | 7.1 | 8.2 | 2.3 | 5.3 | 4.4 | 2.4 | 7.1 | 8.0 |
| | Ten-point mean roughness (μm) | 5.6 | 4.8 | 6.6 | 1.8 | 1.9 | 2.3 | 1.8 | 5.7 | 6.9 |
| Physical Properties of Films | | | | | | | | | | |
| Haze | Sealant film only | 7.0 | 8.2 | 30.0 | 6.0 | 6.8 | 12.3 | 6.7 | 13.8 | 48.8 |
| | Laminated with nylon film | 6.2 | 6.5 | 14.8 | 5.8 | 6.3 | 8.9 | 6.0 | 10.2 | 21.3 |
| Laminate appearance | | ○ | ○ | ○ | ○ | ○ | ○ | ○ | x | x |
| Laminate blocking strength | | ○ | ○ | ○ | Δ | x | ○ | x | ○ | ○ |
| Fusion blocking strength in retort processing | | ○ | ○ | ○ | x | x | x | x | ○ | ○ |

*LS layer and SS layer mean the "lamination-side layer" and "seal-side layer", respectively.

As can be seen from Table 2, all the films of Examples 1–3 exhibited excellent laminate appearance, laminate blocking strength, and fusion blocking strength in retort processing, indicating that these films have necessary characteristics as sealant films for retort packaging.

In contrast, the films of Comparative Examples 1–4, although they exhibited excellent laminate appearance, still had an unresolved problem because of their high fusion blocking strength in retort processing, and the films of Comparative Examples 5–6, although they had high laminate blocking strength and high fusion blocking strength in retort processing, were unsuitable for practical use because of their poor laminate appearance.

Thus, according to the present invention, there can be provided polypropylene multi-layer sealant films for lamination with heat-resisting films as packaging materials for retort-packed products, which sealant films have specific surface roughness on each surface to solve problems on lamination with heat-resisting films, so that no air bubbles are formed at the bonded interface, thereby giving clear laminate appearance, no laminate blocking is caused between the seal-side layer in each sealant film and the corresponding heat-resisting film when the laminated film is made into a rolled film, and no retort blocking is caused between the seal-side layers in the sealant films facing each other when the laminated film is used for retort packaging.

Industrial Applicability

The polypropylene multi-layer sealant films for retort packaging of the present invention can solve the problems of retort blocking and laminate blocking by their controlled surface roughness on each surface. Therefore, these multi-layer sealant films are applicable in retort packaging for various kinds of food. Thus, the present invention makes a large contribution to the industry of retort-packed products, particularly retort-packed food.

What is claimed is:

1. A polypropylene multi-layer sealant film for retort packaging, comprising a multi-layer film composed mainly of at least one polypropylene polymer and to be laminated on one surface of a heat-resisting film, the multi-layer film having a first surface facing the heat-resisting film when laminated therewith and further having a second surface on the other side, the first surface having a surface roughness as defined below in (1), and the second surface having a surface roughness as defined below in (2):

(1)
(i) center-line mean roughness ($R_a$): 0.020 to 0.250 μm;
(ii) maximum height ($R_{max}$): 0.3 to 2.9 μm; and
(iii) ten-point mean roughness ($R_z$): 0.2 to 2.4 μm;

(2)
(i) center-line mean roughness ($R_a$): 0.050 to 0.300 μm;

(ii) maximum height ($R_{max}$): 3.0 to 13.0 μm; and
(iii) ten-point mean roughness ($R_z$): 2.5 to 11.5 μm.

2. The polypropylene multi-layer sealant film for retort packaging according to claim 1, wherein the polypropylene polymer is a propylene random copolymer.

3. The polypropylene multi-layer sealant film for retort packaging according to claim 1, wherein the polypropylene polymer is a propylene block copolymer.

4. The polypropylene multi-layer sealant film for retort packaging according to any one of claims 1, 2, and 3, wherein the multi-layer film has at least one layer containing at least one thermoplastic elastomer.

* * * * *

UNITED STATES PATENT AND TRADEMARK OFFICE
CERTIFICATE OF CORRECTION

PATENT NO.    : 6,663,940 B1
DATED         : December 16, 2003
INVENTOR(S)   : Satoshi Osame et al.

It is certified that error appears in the above-identified patent and that said Letters Patent is hereby corrected as shown below:

<u>Title page,</u>
Item [30], Foreign Application Priority Data, change "11-09012" to -- 11-109012 --.

Signed and Sealed this

Eleventh Day of May, 2004

JON W. DUDAS
*Acting Director of the United States Patent and Trademark Office*